United States Patent [19]

Balonon-Rosen et al.

[11] Patent Number: 6,072,901

[45] Date of Patent: *Jun. 6, 2000

[54] SYSTEM AND METHOD FOR DERIVING AN INVERTIBLE RELATIONSHIP BETWEEN COLOR SPACES WHERE THE INTRINSIC MAPPING IS ONE-TO-MANY FOR USE IN A COLOR PROFILE PRODUCTION SYSTEM

[75] Inventors: Mitchell R. Balonon-Rosen, Cambridge; Jay E. Thornton, Watertown, both of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,918

[22] Filed: May 30, 1997

[51] Int. Cl.$^7$ .............................. G06K 9/00; G06F 15/00
[52] U.S. Cl. ........................... 382/167; 358/1.9; 358/518
[58] Field of Search .................................... 382/163, 167, 382/162; 358/518, 515, 523, 520, 1.2, 1.9, 1.15, 1.1; 345/199, 431; 707/528, 527

[56] References Cited

U.S. PATENT DOCUMENTS

| | | | |
|---|---|---|---|
| 4,967,379 | 10/1990 | Ott ........................................... | 382/112 |
| 5,070,413 | 12/1991 | Sullivan et al. ......................... | 358/456 |
| 5,268,754 | 12/1993 | Capelle et al. ........................... | 358/527 |
| 5,339,176 | 8/1994 | Smilansky et al. ...................... | 358/504 |
| 5,572,632 | 11/1996 | Laumeyer et al. ....................... | 395/116 |
| 5,649,072 | 7/1997 | Balasubramanian .................... | 395/109 |
| 5,694,227 | 12/1997 | Starkweather ........................... | 358/504 |
| 5,806,081 | 9/1998 | Swen et al. .............................. | 707/528 |
| 5,859,711 | 1/1999 | Barry et al. .............................. | 358/296 |
| 5,881,209 | 3/1999 | Stokes ...................................... | 358/1.9 |
| 5,999,703 | 12/1999 | Schwartz et al. ........................ | 358/1.9 |

OTHER PUBLICATIONS

Foley, James D., "Computer graphics: principles and practice", 1987, pp. 580–582.

U.S. application No. 08/709,487, Hultgren et al., filed Sep. 6, 1996.

The International Color Consortium Profile Format Specification, Version 3.3, Nov. 11, 1996.

*Primary Examiner*—Edward L. Coles
*Assistant Examiner*—David Rosenblum
*Attorney, Agent, or Firm*—Robert J. Decker

[57] ABSTRACT

A system and method can generate a singular solution where a color is represented by an unique set of values in a first color space corresponding to more than one set of values which represent the same color in a second color space. One preferred method determines a singular set of colorant values from an N dimensional system for a given set of values from an N minus M dimensional system, $1 \leq M < N$, where a function which describes a transformation from the N dimensional system to the N minus M dimensional system is predefined, and the method includes the steps of: defining a first predetermined error function based on the N minus M dimensional system; defining a second predetermined error function based on the N dimensional system; defining one of the error functions as a primary error function and the other as a secondary error function by applying predetermined weighting functions thereto; combining the primary and secondary error functions; and determining a set of values from the N dimensional system by minimizing the combined error functions.

7 Claims, 3 Drawing Sheets

SYSTEM AND METHOD FOR DERIVING AN INVERTIBLE RELATIONSHIP BETWEEN COLOR SPACES WHERE THE INTRINSIC MAPPING IS ONE-TO-MANY FOR USE IN A COLOR PROFILE PRODUCTION SYSTEM

BACKGROUND OF THE INVENTION

The present invention relates generally to digital image processing and, more particularly, to a system and method thereto where a color is represented by an unique set of values in a first color space corresponding to more than one set of values which represent the same color in a second color space, and where in optimization regime is utilized to choose one particular set of values from the second color space to be associated with the set of values from the first color space. In a particularly useful embodiment where a printer's CMYK digit space is considered the second color space and the L*a*b* domain of printed CMYK combinations is considered the first color space, the invention will provide a singular set of CMYK values determined from all CMYK combinations which produce the same color represented by an unique set of L*a*b* values. By utilizing the invention to produce unique correspondences between a useful sampling of the first color space and sets of values from the second color space, color profiles for use in color management environments are developed.

Digital image processing involves electronically capturing a color image of a scene, altering or otherwise processing the captured image in some desired fashion and passing the processed image to a rendering device. The processing and transfer of a color image throughout a digital image processing system requires the color components of each pixel of the captured image to be represented in various device-dependent color spaces. An upstream element of a digital image processing system can be thought of as a source device associated with a source device color space for representing pixel colors of an input image, whereas a downstream element can be thought of as a destination device associated with a destination device color space for rendering an output image. For instance, a simple image processing system could include: an image acquisition device such as a digital camera, camcorder, scanner, CCD, etc.; a color processor for processing the colors of the image; and an image rendering device, such as a printer, monitor, computer memory, etc. When considering a communication between the image acquisition device and the image rendering device, the image acquisition device is deemed as the source device whereas the image rendering device is deemed as the destination device.

Moreover, image processing can extend beyond the simple systems noted above to special use systems such as a system for proofing images which would include a pre-press proofer, a processing module and a printing press.

Transferring images and documents between digital imaging devices such as monitors, scanners, printers, pre-press proofers and printing presses requires color matching, i.e. matching of color characteristics of the respective devices since different imaging devices have different color capabilities, describe color characteristics in different terms, and operate in different color spaces. For example, a color display monitor in a computer system may operate in RGB color space by creating and describing colors in terms of red, green and blue (RGB) values. The RGB values associated with particular colors for the display monitor are device-dependent in that the RGB values associated with specific colors are particular for the given monitor. Since the RGB values are device-dependent, colors displayed on different monitors will probably not be visually identical even for the same RGB input values.

In contrast to monitors, most printers use cyan magenta, yellow and black (CMYK) values to describe colors, and are said to operate in the CMYK color space. Since the CMYK values are also device-dependent, colors printed on any given printer will probably not match colors printed on a different printer for the same CMYK value.

Different devices also have different color capabilities. Every rendering device, such as a printer or monitor, has a limited range of colors, i.e. a gamut, that it can reproduce. Those skilled in the art will recognize that color display monitors tend to be able to produce a wider range of lighter colors whereas color printers tend to be able to produce a wider range of darker colors. Consequently, the gamut for a color display monitor is different from the gamut for a color printer. As a result, some colors displayed on display monitors cannot be reproduced on color printers and vice versa.

In recent years, device-independent paradigms for the characterization of color information in an image processing system have been developed and are being implemented. ColorSync, developed by Apple Computer and KCMS, developed by Eastman Kodak Co., are examples of systems or components supporting a device-independent color paradigm. This paradigm is based upon a characterization of the image pixel data or digits in a device-independent color space, e.g. CIE L*a*b* or CIE XYZ, using a color management system. Device digits are defined as independently specifiable pixel values which control how a device renders color. For example, a four color printer would print each pixel having specific device digits corresponding to the CMYK values.

The characterization of a device's image pixel data in device independent color space is commonly codified in a tagged file structure, referred to as a device profile, that accompanies the digital imaging device. A device profile is a digital representation of the relation between device coordinates and a device-independent specification of color. Other types of profiles are device link, color space conversion, abstract or named color profiles. Device link profiles provide a mechanism in which to save and store a series of device profiles and non-device profiles in a concatenated format as long as the series begins and ends with a device profile. Profiles are standardized and further discussed in the International Color Consortium (ICC) Profile Format Specification, Version 3.3, Nov. 11, 1996, page 101. Moreover, non-color spatial information can be included in profiles as disclosed in U.S. patent application Ser. No. 08/709,487 filed Sep. 6, 1996 by Hultgren et al. Both documents are herein incorporated by reference in their entirety for supplemental background information which is non-essential but helpful in appreciating the applications of the present invention.

When transferring color information from a 3 dimensional color space, such as L*a*b*, to a 4 dimensional color space, such as CMYK, a one-to-many problem occurs. In other words for an unique set of L*a*b* values, more than one solution set of CMYK values may be available. This problem is well recognized in the industry and addressed by known methods such as under color removal (UCR), gray component replacement (GCR) and under color addition (UCA). These methods and similar processes have been developed by skilled operators with years of crafts experience implemented by a first conversion to the three dimensional color space of CMY and followed by the introduction of the black component (K) in place of some amount of CMY. The final levels of K and CMY are dependent upon the CMY values resultant from the first conversion.

It is a primary object of the present invention to provide a system and method thereto for solving the one-to-many problem described above. This and other objects and advantages of the invention will be apparent from the following detailed description.

SUMMARY OF THE INVENTION

A system and method can generate a singular solution where a color is represented by an unique set of values in a first color space corresponding to more than one set of values which represent the same color in a second color space. One preferred method determines a singular set of colorant values from an N dimensional system for a given set of values from an N minus M dimensional system, $1 \leq M < N$, where a function which describes a transformation from the N dimensional system to the N minus M dimensional system is predefined, and the method includes the steps of: defining a first predetermined error function based on the N minus M dimensional system; defining a second predetermined error function based on the N dimensional system; defining one of the error functions as a primary error function and the other as a secondary error function by applying predetermined weighting functions thereto; combining the primary and secondary error functions; and determining a set of values from the N dimensional system by minimizing the combined error functions.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
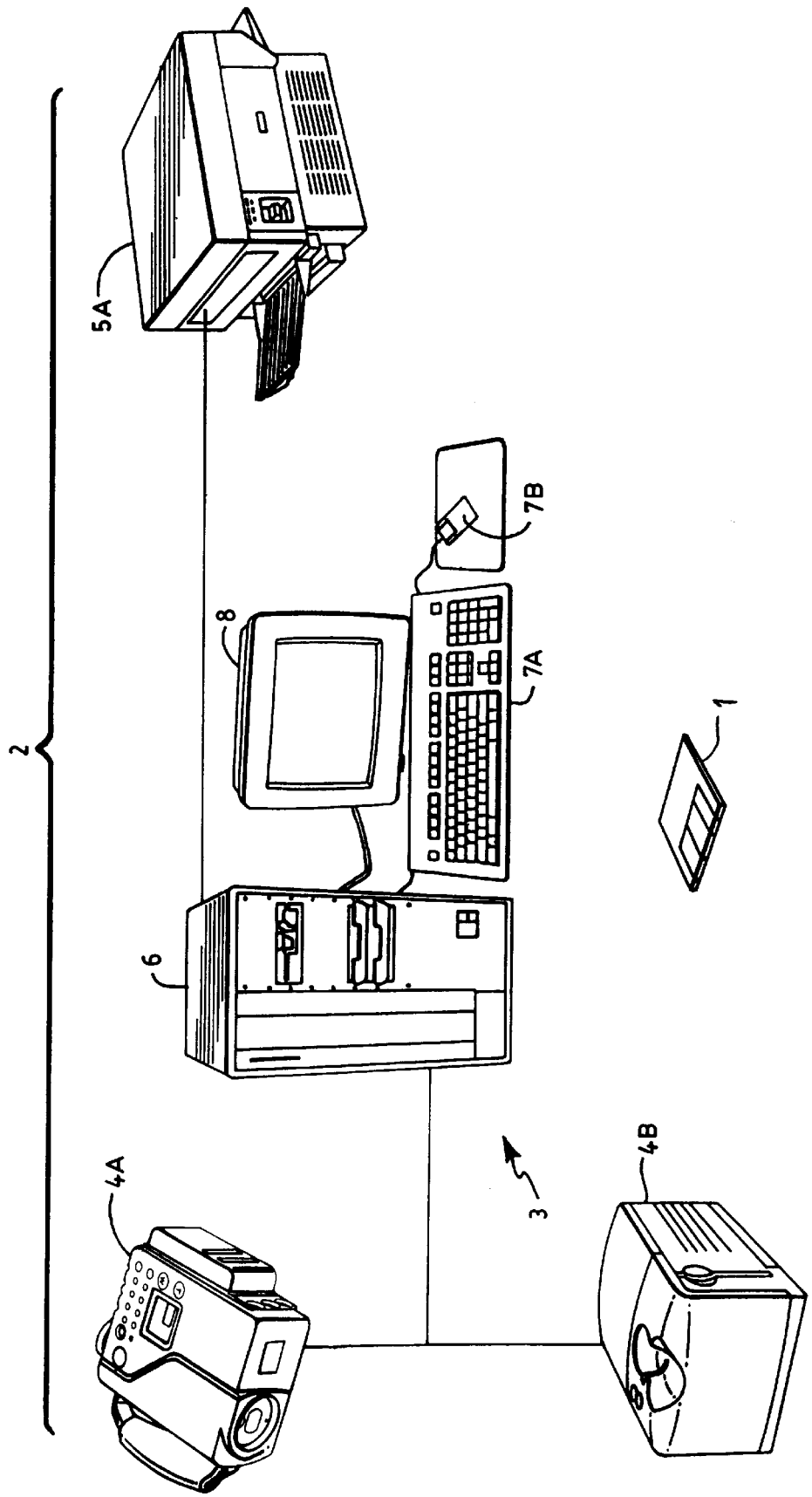
FIG. 1 is a block diagram of a digital image processing system which can be used in conjunction with the inventive process.

FIG. 1 illustrates one example of an image acquisition and rendering system, also referred to as a computer system, 2 that can be used in cooperation with the inventive system and method. The system 2 includes a computer 3, one or more image acquisition or source devices represented by a digital camera 4A and a scanner 4B for acquiring an image and converting it to digital image data, and one or more image rendering or destination devices represented here by a color printer 5A for generating an output image. The computer 3, which in one embodiment is a general-purpose digital computer, is capable of receiving and processing digital image data.

As is conventional, the computer 3 includes a processor module 6 and operator interface elements such as a keyboard 7A, a mouse 7B and a video display device 8. The processor module 6 includes, for example, processor, memory and mass storage devices such as disk and/or tape storage elements (not separately shown) which perform processing and storage operations in connection with digital data provided thereto. The computer 3 will generally be processing certain programs which could be stored and retrieved from the hard drive or a computer-readable medium 1 such as a magnetic diskette or a CD-ROM, which enable it to perform selected image processing operations. The operator input elements 7A and 7B are provided to permit an operator to input information for processing. The video display device 8 is provided to display output information to the operator. Although the illustrated image acquisition and rendering system 2 shows particular components, it will be appreciated that the computer system 3 may include a variety of components in addition to or instead of those depicted in FIG. 1, such as special-purpose hardware and/or program components, or a combination of a computer 3 with special-purpose hardware and/or program components.

Figure 2:
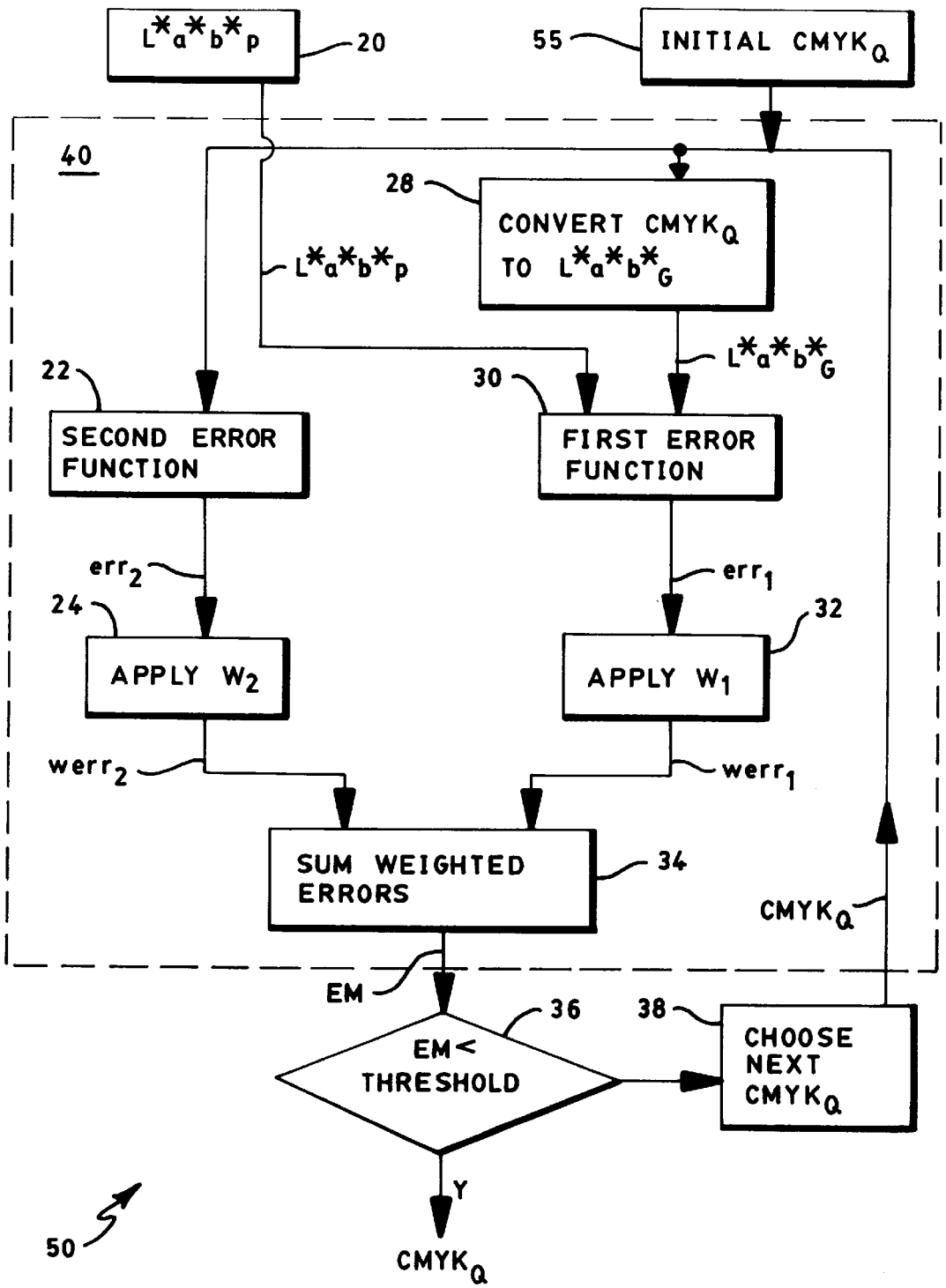
FIG. 2 is a flowchart diagram of steps, in accordance with a first and second preferred embodiment of the inventive method, for determining a singular N dimensional color space solution set for an unique N minus M dimensional color space.
Figure 3:
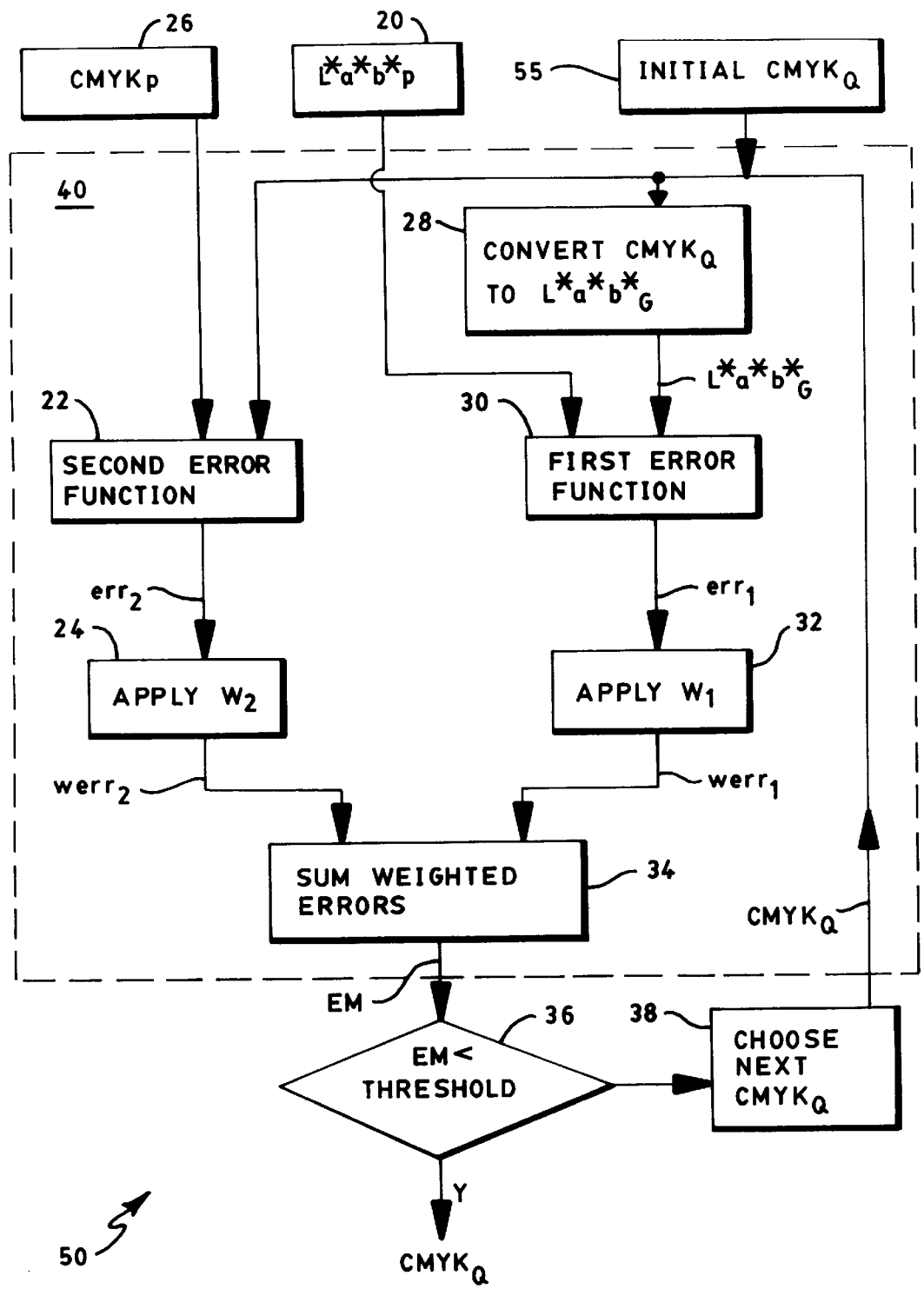
FIG. 3 is a flowchart diagram of steps, in accordance with a third preferred embodiment of the inventive method, for determining a singular N dimensional color space solution set for an unique N minus M dimensional color space.

Processor 6 contains an optimization engine for error metric minimization, in accordance with the principals of the invention, through the use of an error metric function. One preferred optimization engine 50 is illustrated in FIG. 2. One general embodiment of the inventive method which can be implemented by the optimization engine 50 involves determining a singular N dimensional color space solution set from an unique set of values resident in N minus M dimensional color space. Variants of this embodiment are illustrated in FIGS. 2 and 3.

In FIG. 2, the optimization engine 50 includes an error metric function 40 used, in accordance with a first embodiment of the inventive method, for addressing a problem associated with device profiles of mapping 3 dimensional device-independent color space, such as L*a*b*, to 4 dimensional device-dependent color space, such as CMYK. Otherwise stated, the problem is: for a given $L^*a^*b^*_P$, what $CMYK_Q$ should be delivered to a printer which will render $L^*a^*b^*_P$ within tolerance? The solution is complicated in that, for a typical in-gamut $L^*a^*b^*_P$, there are multiple combinations of C, M, Y and K which will produce the color. The mapping attempts to maintain calorimetric fidelity between specified device-independent $L^*a^*b^*_P$ values and the $CMYK_Q$ measurements of printed device digits which are produced by transforming the device-independent values through the color map. The primary error in this example is the colorimetric error which is generated by a first error function 30, whereas the secondary error generated by a second error function 22 is a destination space error which in this case is a typical GCR constraint described as a function of black and the minimum of cyan, magenta and yellow.

As this example is being used in producing a device profile, a sampling of device-independent $L^*a^*b^*_P$ values is provided one at a time in block 20. For each sampled $L^*a^*b^*_P$ value, an initial $CMYK_Q$ value is provided in block 55. The optimization engine 50 will then modify subsequent $CMYK_Q$ values at block 38 with the goal of minimizing the combined error produced in block 34. Block 28 converts $CMYK_Q$ values to $L^*a^*b^*_G$ coordinates. The first error function 30 generates the first error $err_1$ which is mathematically represented, for this example, by equation (1).

$$err_1 = \{(L^*_G - L^*_P)^2 + (a^*_G - a^*_P)^2 + (b^*_G - b^*_P)^2\}^{1/2} \qquad (1)$$

The second error function 22 generates the second error $err_2$ which is mathematically represented, for example, for $CMYK_Q$ by equation (2).

$$err_2 = 0.1\, K_Q - 0.9\, \min(C_Q, M_Q, Y_Q) \quad (2)$$

The constants in equation (2) are predetermined as desired by the system designer.

A first weighting function is applied to the first error $err_1$ in block 32 to produce a weighted first error $werr_1$. In equation (3), the weighted first error $werr_1$ equals the first error $err_1$ minus a predetermined tolerance parameter $\epsilon$, the quantity multiplied times a predetermined first weighting constant $w_1$ (here $w_1=100$). If $err_1$ is less than or equal to $\epsilon$, then $werr_1$ is set to zero.

$$werr_1 = 100(err_1 - \epsilon), \text{ where } werr_1 = 0 \text{ if } (err_1 \leq \epsilon) \quad (3)$$

Applying sufficient weight to the primary error $err_1$ forces the error metric function 40 to bring the weighted primary error $werr_1$ to an approximate global minimum. However, due to redundancy there may be multiple answers which satisfy the globally minimized weighted primary error $werr_1$. When there is such redundancy, a single solution set of $CMYK_Q$ values will be determined since a weighted secondary error $werr_2$ is simultaneously being minimized. The weighted primary error $werr_1$ will sharply penalize guesses of $CMYK_Q$ as the $L^*a^*b^*_G$ values wander more than a predetermined tolerance parameter $\epsilon$ away from a particular $L^*a^*b^*_P$ value. The tolerance parameter $\epsilon$ is chosen to expand the pool of allowable choices for minimizing the weighted secondary error $werr_2$.

A second weighting function is applied to the second error $err_2$ in block 24 to produce the weighted second error $werr_2$. In this example, $werr_2$ equals the second error $err_2$ times a predetermined second weighting constant $w_2$ where, in this case, $w_2=1$.

$$werr_2 = err_2 \quad (4)$$

The weighted first and second errors $werr_1$ and $werr_2$ are combined in block 34 to yield the error metric EM. Note that the normalization of error units between $err_1$ and $err_2$ is built into the weighting functions of blocks 24 and 32 to allow the combined error to be valid. For this example, EM is the sum of $werr_1$ and $werr_2$.

$$EM = werr_1 + werr_2 \quad (5)$$

The error metric EM is tested in decision block 36 against a predetermined threshold value to determine whether the minimized $CMYK_Q$ solution set has been attained. If not, a new set of $CMYK_Q$ values is selected in block 38 by the optimization engine 50 and sent to blocks 22 and 28 where the process continues until the minimized error metric EM associated with a single solution set of $CMYK_Q$ values is generated.

A second embodiment of the inventive method applies to a 4 color device mapping problem for a device link profile. In this example, a pre-press proofer having a CMYK destination space is set up to emulate the color rendering characteristics of a printing press having a different CMYK source space whereby a mapping is derived which maintains color appearance between digits printed on the printing press and those digits manipulated by the color map and then printed by the pre-press proofer. Otherwise stated, the problem is: given the digital specification of $CMYK_P$ which when printed on a printing press has the measurement $L^*a^*b^*_P$, what solution set $CMYK_Q$ should be delivered to the pre-press proofing device which will render $L^*a^*b^*_P$ within tolerance? Again the problem is complicated by the fact that for a typical in-gamut $L^*a^*b^*_P$, there exists multiple combinations of $CMYK_Q$ which will produce the desired color.

This problem can be solved using the sample error rhetoric function 40 of the optimization engine 50 of FIG. 2 whereby $CMYK_P$ is associated with $L^*a^*b^*_P$. Again, the primary error is the colorimetric error $err_1$ and the secondary error is a typical GCR constraint $err_2$.

A sampling of $CMYK_P$ values are printed on the printing press, measured in device-independent $L^*a^*b^*_P$ units, and provided one at a time by block 20. For each sampled $L^*a^*b^*_P$ value an initial $CMYK_Q$ value is presented by block 55. The optimization engine 50 modifies $CMYK_Q$ values at block 38 with the goal of minimizing the combined error in block 34. All the mechanisms of the various blocks of FIG. 2 are otherwise identical to the first embodiment.

In a third embodiment directed towards a device link profile with dot-preserving character, a proofing device is used to emulate both the color rendering characteristics and the dot character of a printing press. Otherwise stated, the problem is: given the digital specification of $CMYK_P$ which when printed on a printing press has the measurement $L^*a^*b^*_P$ and physical dot character which results in certain macro patterns, what $CMYK_Q$ should be delivered to the pre-press proofing device which will render $L^*a^*b^*_P$ within tolerance and which will display similar macro patterns? Again, for a typical in-gamut $L^*a^*b^*_P$ there are multiple combinations of $CMYK_Q$ which will produce the same color, but typically none of the combinations includes $CMYK_Q$ values which, given the assumption of the same screening approach and dot shape, is the only $CMYK_Q$ solution which guarantees the same dot character. The goal of emulation in this embodiment is to achieve a mapping which (i) maintains color appearance between digits printed on the printing press and those digits manipulated by the color map and printed on the proofer, and (ii) preserves artifacts associated with dot structure combinations between digits printed on the printing press and digits printed on the proofer.

The problem of the third embodiment is solved through the use of the error metric function 40 of the optimization engine 50 of FIG. 3 where the destination space error $err_2$ is primary and the colorimetric error $err_1$ is secondary. The second error function of block 22 is mathematically represented as $$err_2 = \{(C_P - C_Q)^2 + (M_P - M_Q)^2 + (Y_P - Y_Q)^2 + (K_P - K_Q)^2\}^{1/2} \quad (6)$$

Sampling of the $CMYK_P$ values printed on the printing, press are measured and fed one at a time in $L^*a^*b^*_P$ units from block 20. An initial $CMYK_Q$ value is also provided to blocks 22 and 28 from block 55. The original $CMYK_P$ values printed on the printing press to produce the measured $L^*a^*b^*_P$ values of block 20 are presented to block 22 of the error metric function 40 from block 26. The optimization engine 50 minimizes the error metric EM through modification of the $CMYK_Q$ values. Block 28 in FIG. 3 converts the $CMYK_Q$ values to $L^*a^*b^*_G$ coordinates.

The first error $err_1$ is produced in block 30 in accordant with equation (1) and weighted in block 32 by equation (7) to produce the weighted first error $werr_1$.

$$werr_1 = err_1 \quad (7)$$

Note that in this example, $err_2$ is the primary error and $err_1$ is the secondary error. The first weighted error $werr_1$ equals the product of the first error $err_1$ times a predetermined first weighting constant $w_1$ where, in this case, $w_1=1$.

The second error $err_2$ is produced in block 22 by equation (6) and weighted in block 24 to produce the weighted second error werr$_2$ which equals the second error err$_2$ minus the predetermined tolerance parameter $\epsilon$, the quantity multiplied times a predetermined second weighting constant w$_2$ (in this case, w$_2$=100).

$$\text{werr}_2 = 100(\text{err}_2 - \epsilon), \text{ where werr}_2 = 0 \text{ if } (\text{err}_2 \leq \epsilon) \qquad (8)$$

If err$_2$ is less than or equal to $\epsilon$, then werr$_2$ is set to zero.

Again the tolerance parameter $\epsilon$, which is attached to the weighted primary error werr$_2$ as shown in equation (8), expands the pool of allowable choices for minimizing the weighted secondary error werr$_1$.

The weighted first and second errors werr$_1$ and werr$_2$ are combined in block 34 to yield the error metric EM which, in turn, is tested in decision block 36 against a predetermined threshold value to determine whether the minimized CMYK$_O$ solution set has been attained. If not, a new set of CMYK$_Q$ values is selected in block 38 by the optimization engine 50 and sent to blocks 22 and 28 where the process continues until the minimized error metric EM associated with a single solution set of CMYK$_Q$ values is generated.

It is to be understood that the above described embodiments are merely illustrative of the present invention and represent a limited number of the possible embodiments that can provide applications of the principles of the invention. For instance, scanners in the graphics arts industry sometimes utilize CMYK coordinates for color characterization purposes and could thus benefit from use of the invention. Numerous and varied other arrangements may be readily devised in accordance with these principles by those skilled in the art without departing from the spirit and scope of the invention as claimed.

What is claimed is:

1. A method for use with a digital image processing system for transforming a digital signal represented by a set of values from a first four dimensional device-dependent color space to a digital signal represented by a set of values in another four dimensional device-dependent color space comprising the steps of:
   (a) providing one of a plurality of corresponding four dimensional first device-dependent color space values and one of a plurality of corresponding four dimensional second device-dependent color space values;
   (b) converting the one of the four dimensional first device-dependent color space values and the one of the four dimensional second device-dependent color space values to a corresponding converted three dimensional first device-independent color space value and converted three dimensional second device-independent color space values;
   (c) determining a first error value from the converted three dimensional first device-independent color space value and the converted three dimensional second device-independent color space value;
   (d) determining a second error value from the one of the four dimensional second device-dependent color space values and one of the four dimensional first device-dependent color space values;
   (e) determining an error metric value from the first error value and the second error value; and
   (f) comparing the error metric value with a threshold value and providing the one of a plurality of corresponding four dimensional second device-dependent color space values as an output value when the error metric value is less than the threshold value.

2. The method of claim 1 further comprising repeating steps (a) through (f) until the error metric value is less than the threshold value and then repeatedly providing a new one of the plurality of four dimensional first device-dependent color space values and applying steps (a) through (f) for the purpose of creating a mapping of a collection of digital signals representing a set of values in a first four dimensional device dependent color space to a corresponding collection of digital signals representing a set of values in a second four dimensional device-dependent color space.

3. The method of claim 2 further comprising the step of producing a device link profile from said mapping of the digital signals represented by a set of values in a first four dimensional device-dependent color space to digital signals represented by a set of values in a second four dimensional device-dependent color space.

4. The method of claim 1 wherein the step of determining a first error value from the converted three dimensional first device-independent color space value and the converted three dimensional second device-independent color space value comprises the step of applying a weighting function to the first error value to provide a weighted first error value.

5. The method of claim 4 wherein the step of determining a second error value from the one of a plurality of corresponding four dimensional first device-dependent color space values and one of a plurality of corresponding four dimensional second device-dependent color space values comprises the step of applying a weighting function to the second error value to provide a weighted second error value.

6. The method of claim 1 wherein said first and second device-dependent color spaces are cyan, magenta, yellow, black (CMYK) color space and said first and second device-independent color spaces are selected from the group consisting of XYZ and L*a*b* color space.

7. A system to transform digital signals represented by sets of values in a first four dimensional device-dependent color space to digital signals represented by sets of values in a second four dimensional device-dependent color space comprising:
   (a) means for providing one of a plurality of corresponding four dimensional first device-dependent color space values and one of a plurality of potentially corresponding four dimensional second device-dependent color space values;
   (b) means for converting the four dimensional first device-dependent color space values and the four dimensional second device-dependent color space values to a corresponding converted three dimensional first device-independent color space value and converted three dimensional second device-independent color space value;
   (c) means for determining a first error value from the converted three dimensional first device-independent color space value and the converted three dimensional second device-independent color space value;
   (d) means for determining a second error value from the four dimensional second device-dependent color space values and the four dimensional first device-dependent color space values;
   (e) means for determining an error metric value from the first error value and the second error value; and
   (f) means for comparing the error metric value with a threshold value and providing the one of a plurality of corresponding four dimensional second device-dependent color space values as an output value when the error metric value is less than the threshold value.

* * * * *